United States Patent [19]

Rosenquist

[11] 4,335,032
[45] Jun. 15, 1982

[54] POLYCARBONATE RESIN IMPACT MODIFIED WITH POLYOLEFINS AND CONTAINING POLYORGANOSILOXANE FLUIDS

[75] Inventor: Niles R. Rosenquist, Evansville, Ind.

[73] Assignee: General Electric Company, Mt. Vernon, Ind.

[21] Appl. No.: 221,934

[22] Filed: Dec. 31, 1980

[51] Int. Cl.³ .............................................. C08L 69/00
[52] U.S. Cl. ................................... 524/269; 524/262; 524/263; 524/508
[58] Field of Search ................................ 260/29.15 B

[56] References Cited

U.S. PATENT DOCUMENTS

| | | | |
|---|---|---|---|
| 3,431,224 | 3/1969 | Goldblum | 260/37 PC |
| 3,437,631 | 4/1969 | Cleveland | 260/37 PC |
| 4,147,707 | 4/1979 | Alewelt et al. | 260/37 PC |
| 4,148,773 | 4/1979 | Mark et al. | 260/29.15 B |

FOREIGN PATENT DOCUMENTS 2832342 1/1980 Fed. Rep. of Germany ... 260/29.15 B

Primary Examiner—William F. Hamrock
Assistant Examiner—Peter F. Kulkosky
Attorney, Agent, or Firm—Martin B. Barancik; William F. Mufatti

[57] ABSTRACT

A polycarbonate composition having improved melt flow and improved impact strength after aging at elevated temperatures comprising polycarbonate resin with polyolefins and a polyorganosiloxane. A preferred composition comprises in admixture a high molecular weight aromatic carbonate polymer and a minor amount of a polyolefin and a polydimethylsiloxane fluid.

9 Claims, No Drawings

POLYCARBONATE RESIN IMPACT MODIFIED WITH POLYOLEFINS AND CONTAINING POLYORGANOSILOXANE FLUIDS

This invention relates to polycarbonate compositions and more particularly to modified polycarbonate compositions having additives to improve the melt flow and impact strength after aging at elevated temperatures.

BACKGROUND OF THE INVENTION

Polycarbonate polymers are excellent molding materials because products made therefrom have high impact strength, toughness, high transparency, wide temperature limits (high impact resistance below −60° C. and a UL thermal endurance rating of 115° C. with impact), good dimensional stability, high creep resistance and electrical properties which qualify it as sole support for current carrying parts.

Polycarbonates are, however, very difficulty to fabricate from melts for the reason that melts thereof have exceptionally high viscosities. Attempts to overcome this difficulty by the incorporation with the polycarbonate of materials known to reduce the viscosity of other resins have generally been unsuccessful. Many conventional viscosity control agents appear to have little or no effect on the viscosity of polycarbonate. Other compounds known to lower the viscosity of resins cause degradation of polycarbonate resins. Some compounds, conventionally employed to improve the workability of polymers, produce an embrittling effect on polycarbonates when they are mixed therewith and the resin is subjected to elevated temperatures as in molding. Still other materials, while satisfactory stiffness modifying agents for other plastics, are too volatile to be incorporated with polycarbonates since polycarbonates have much higher melting points than many other thermoplastics.

Another difficulty with polycarbonates is that they are subject to loss of their high impact strength upon aging at elevated temperatures. Attempts to overcome this difficulty by incorporation with the polycarbonate of impact modifiers such as polyolefins have been to some extent successful. However, these impact modified compositions will also undergo embrittlement if subjected to elevated temperatures for a sufficient period of time since these impact modifiers tend to only prolong the period of time until the embrittlement accurs.

SUMMARY OF THE INVENTION

In accordance with the present invention there is herein disclosed a polycarbonate composition comprising in admixture a high molecular weight aromatic carbonate polymer and a minor amount of a polyolefin and a polyorganosiloxane.

It has been discovered that, by admixing a minor amount of a polyolefin and a polyorganosiloxane fluid with a high molecular weight aromatic carbonate polymer, the resultant polycarbonate composition has reduced melt viscosity and has less of a tendency to emibrittle upon molding or aging at elevated temperatures than compositions containing either the impact modifying agent alone (the polyolefin) or the flow enhancing agent alone (the polyorganosiloxane fluid) and thus retains its characteristic high impact strength.

DETAILED DESCRIPTION OF THE INVENTION

The polyorganosiloxanes of the present invention are characterized by the general formula:

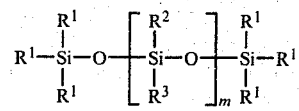

wherein $R^1$ is a radical selected from the group consisting of alkyl, haloalkyl, aryl, aralkyl, alkaryl, alkoxy, aryloxy, and halogenated derivatives of the aforesaid aryl, aralkyl, alkaryl, alkoxy or aryloxy radicals; $R^2$ and $R^3$ are radicals selected from the group consisting of (lower) alkyl or phenyl radicals; and m is an integer of such a value that the polyorganosiloxane is a fluid at ambient temperatures. The (lower) alkyl radicals in the polyorganosiloxanes will contain from 1 to about 10 carbon atoms, straight chain or branched.

In preferred embodiments of the invention, $R^1$, $R^2$ and $R^3$ are methyl. Special mention is made of a preferred class of polyorganosiloxanes which includes polymethylalkylsiloxane, polymethylphenylsiloxane, polydimethylsiloxane, polydiphenylsiloxane and copolymers such as methylphenyl and dimethyldiphenylpolysiloxane copolymer. Good properties have been found with compositions prepared from a polydimethylsiloxane fluid.

The polyorganosiloxanes of the present invention are prepared, for example, by the hydrolysis of hydrolyzable aliphatic- or aromatic-substituted silanes, such as dialiphatic dihalosilanes, for example, dimethyldichlorosilane, followed by complete or partial condensation of the hydrolysis product. They may also be prepared, for example, by hydrolyzing mixtures of hydrolyzable diorgano-substituted silanes either among themselves or with hydrolyzable silanes containing, for example, three organic radicals substituted on the silicon atom, for instance, trimethylchlorosilane.

A further method for preparing the organo-substituted polysiloxanes comprises hydrolyzing a diorgano-substituted dihalosilane, isolating the hydrolysis product and effecting reaction between the hydrolyzed product and, e.g., hexamethyl disiloxane in the presence of sulfuric acid. More specific directions for the hydrolysis of hydrolyzable organo-substituted silanes to form organo-substituted polysiloxanes may be found, for example, in patents and in the literature now available in the art.

By the term "hydrolyzable organo-substituted silanes" it is intended to mean derivatives of $SiH_4$ which contain hydrolyzable groups or radicals, for example, halogens, amino groups, alkoxy, aryloxy, acyloxy radicals, and the like, in addition to the organic groups substituted directly on the silicon atom that are joined to the silicon through carbon-silicon linkages. Examples of such organic radicals are aliphatic radicals including alkyl radicals, for example, methyl, ethyl, propyl, isopropyl, butyl, and the like; alicyclic radicals, for example, cyclopentyl, cyclohexyl, and the like; aryl radicals, for example, phenyl, diphenyl, naphthyl, anthracyl, and the like; aralkyl radicals, for example, benzyl, phenethyl, and the like; alkaryl radicals, for example, tolyl, xylyl, and the like; heterocyclic radicals; as well as hydrolyzable silanes containing two different organic radicals, for example, methyl and phenyl radicals, and the like; attached to the silicon atom. If desired, the above-mentioned radicals may also contain substituents substituted thereon, for instance, halogens, e.g., di-, tri-, and tetra-chlorophenylchlorosilanes, for example, tri-chlorophenyltrichlorosilane, tetra-chlorophenyltrichlorosilane, and the like. The monochlorosilanes, of course, act as chainstoppers.

Hydrolysis of the above silanes or mixtures of silanes results in the formation of silanols, i.e., organo-substituted silanes containing hydroxy groups substituted directly on the silicon, which hydroxy groups almost immediately condense intermolecularly (intercondense) splitting out water to give the siloxane linkages mentioned previously.

Such intercondensations are accelerated by acidic materials, for example, sulfuric acid, hydrochloric acid, ferric chloride, and the like as well as basic materials, for example, sodium hydroxide, potassium hydroxide, and the like. As a result of the hydrolysis and condensation, organo-substituted polysiloxanes may be produced which are partially or completely condensed and which may have on an average up to as high as three organic radicals substituted per silicon atom, but preferably from 1.98 to 2.25 organic groups per silicon atom.

Illustrative of the polyorganosiloxanes which can be employed in the practice of the present invention include a polydimethylsiloxane fluid manufactured and sold by the General Electric Company under the trademark SF 96. SF 96® fluids are available in standard viscosity grades; nominally 5, 20, 50, 100, 350, 500 and 1,000 centistokes at 25° C. Another illustration is a polydimethyldiphenylsiloxane fluid manufactured and sold by the General Electric Company under the designation SF 1153 having nominal viscosity of 100 centistokes at 25° C. A further illustration is a polymethylalkylsiloxane fluid manufactured and sold by the General Electric Company under the designation SF 1091 having a nominal viscosity of 500 centistokes at 25° C. Also included is a polydiphenyldimethylsiloxane fluid of the General Electric Company designated CF-1142 having a nominal viscosity of from 10 to 30 centistokes at 25° C.

The amount of polyorganosiloxane employed in the practice of the present invention may vary from about .05 to about 1.5 parts per hundred parts of aromatic carbonate polymer. Preferably, the polyorganosiloxanes are employed in amounts of 0.1 to about 0.75 parts per hundred parts of aromatic carbonate polymer.

In the practice of the invention, a polyorganosiloxane is incorporated with a polyolefin into an aromatic polycarbonate composition. Polyolefins act as impact modifiers in polycarbonate compositions increasing the impact strength of the same. Suitable polyolefins for use in the present invention include, for example, polyethylene, polypropylene, polyisobutylene, ethylene propylene diene monomer (EPDM) and their oxides, copolymers and terpolymers. Other polyolefins suitable for use herein will be apparent to those skilled in the art. The preferred polyolefins are polyethylene and polypropylene. These polyolefins and their oxides, copolyme-s and terpolymers are available commercially.

The amount of the polyolefin present in the composition of the present invention can range from about 2 parts to about 8 parts, by weight, per hundred parts of the aromatic polycarbonate. Preferably, the polyolefin is present in amounts of from about 3.5 parts to about 4.5 parts, by weight, per hundred parts of the aromatic polycarbonate.

In the practice of this invention, the high molecular weight aromatic polycarbonates that can be employed herein are homopolymers and the copolymers and mixtures thereof which have an intrinsic viscosity of 0.40 to 1.0 dl./g. as measured in methylene chloride at 25° C. that are prepared by reacting a dihydric phenol with a carbonate precursor. Typical of some of the dihydric phenols that can be employed in the practice of this invention are bisphenols such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2,2-bis(4-hydroxy-3,5-dichlorophenyl) propane, 2,2-bis(4-hydroxy-3,5-dibromophenyl) propane, and the like; dihydric phenol ethers such as bis(4-hydroxyphenyl) ether, bis(3,5-dichloro-4-hydroxyphenyl) ether, and the like; dihydroxydiphenyls such as p,p'-dihydroxydiphenyl, 3,3'-dichloro-4,4'-dihydroxydiphenyl, and the like; dihydroxyaryl sulfones such as bis(4-hydroxyphenyl) sulfone, bis(3,5-dimethyl-4-hydroxyphenyl) sulfone, and the like; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene and the like; and dihydroxy diphenyl sulfoxides such as bis(4-hydroxyphenyl) sulfoxide, bis-(3,5-dibromo-4-hydroxyphenyl) sulfoxide, and the like. A variety of additional dihydric phenols are also available to provide carbonate polymers and are disclosed in U.S. Pat. Nos. 2,998,835; 3,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane, and the like.

It is, of course, possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the blend compositions of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein, are carbonly bromide, carbonyl chloride and mixtures thereof. Typical of the carbonate esters which may be employed herein, are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hhdroquinone, etc.) or glycols (bis-haloformates of ethylene glycol, neopentyl glycol, polyethylene glycol, etc.). While other carbonate precursors will occur to those skilled in the art, carbonyl chloride, also known as phosgene, is preferred.

The polycarbonates can also be made from a dihydric phenol, a dicarboxylic acid and carbonic acid. These are disclosed in U.S. Pat. No. 3,169,121 which is incorporated herein by reference.

The aromatic carbonate polymers of this invention are preferably prepared by employing a molecular weight regulator, an acid acceptor and a catalyst. The molecular weight regulators which may be employed in carrying oqt the process of this invention include phenol, cyclohexanol, methanol, para-tertiarybutylphenol, parabromophenol, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bincarbonate, or a phosphate of an alkali or alkali earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformly or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acids or their acid chloride derivatives.

Also included herein are blends of a linear polycarbonate and a branched polycarbonate.

The composition of the instant invention may be prepared by blending the high molecular weight aromatic polycarbonate with the polydiorganosiloxane fluid and the polyolefin impact modifier by conventional methods.

Obviously, other materials can also be employed with the aromatic carbonate polymer of this invention and include such materials an anti-static agents, pigments, thermal stabilizers, ultraviolet stabilizers, reinforcing fillers and the like.

PREFERRED EMBODIMENTS OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLES

A polycarbonate composition was prepared by reacting essentially equimolar amounts of 2,2-bis(4-hydroxyphenyl) propane (referred to as bisphenol-A) and phosgene in an organic medium with triethylamine, aqueous sodium hydroxide and phenol. One hundred parts of the polycarbonate composition was then optionally mixed with a high density polyethylene manufactured by the U.S. Industrial Chemicals Co. (USI) under the designation LB742 in amounts indicated in the tables and a polyorganosiloxane fluid in amounts set forth in the tables. These polyorganosiloxane fluids are manufactured by the General Electric Company and have been previously described. The resulting mixture was then fed to an extruder which was operated at from 229° C. to about 310° C. and the extrudate was comminuted into pellets.

The melt flow rates were determined and are set forth in Table 1.

Additionally, the pellets were injection molded at about 299° C. into test bars of about 2 ½ in. by about ½ in. by about ⅛ in. thick. The impact strength of these bars were measured according to the Notched Izod test, ASTM D-256. The impact strength is set forth in Tables 1, 2 and 3. The sample labelled CONTROL is the polycarbonate as prepared without the polyethylene and the polyorganosiloxane fluid.

TABLE 1

| ADDITIVES | | MELT FLOW RATE gr./ 10 min. | IMPACT STRENGTH (ft. lb/in.) 1/8 in. Notched Izod | | |
|---|---|---|---|---|---|
| Impact Modifier (4.2 parts per hundred) (LB742) | Polyorganosiloxane Fluid (0.75 parts per hundred) | | as molded | aged 4 hrs. at 125° C. | aged 24 hrs. at 125° C. |
| Polyethylene | None | 10.3 | 14.0 | 8.0 | 2.9 |
| Polyethylene | branched methyl phenyl (CF1142) | 11.6 | 13.3 | 8.0 | 5.9 |
| Polyethylene | polydimethylsiloxane (SF96 ®-50) | 11.0 | 10.7 | 6.7 | 6.0 |
| Polyethylene | polydimethyldiphenylsiloxane (SF-1153) | 10.8 | 10.7 | 6.5 | 5.3 |
| Polyethylene | polymethyloctyl siloxane (SF-1091) | 11.0 | 9.3 | 6.3 | 4.7 |

TABLE 2

| ADDITIVES | | MELT FLOW RATE (gr/10 min) | IMPACT STRENGTH (ft. lb./in. of notch) 1/8 Inch Notched Izod | | |
|---|---|---|---|---|---|
| Polyethylene (LB742 Mfg. by USI) | Polydimethylsiloxane (SF 96 ®-50) | | As Molded | Aged 4 Hrs. At 125° C. | Aged 24 Hrs. At 125° C. |
| None (Control) | None | 10.5 | 16.7 | 1.9 | — |
| None | 0.75 parts per hundred | 10.9 | 15.1 | 1.7 | — |
| 2.1 parts per hundred | 0.75 parts per hundred | 10.9 | 15.3 | 4.5 | 2.2 |
| 4.2 parts per hundred | 0.75 parts per hundred | 10.7 | 15.3 | 10.0 | 9.3 |
| 6.3 parts per hundred | 0.75 parts per hundred | 11.5 | 13.3 | 10.0 | 8.7 |
| 8.4 parts per hundred | 0.75 parts per hundred | 11.5 | 12.0 | 8.8 | 8.2 |

TABLE 3

| ADDITIVES | | MELT FLOW RATE (gr/10 min.) | IMPACT STRENGTH (ft. - lb./in. of notch) 1/8 Inch Notched Izod | | |
|---|---|---|---|---|---|
| Polyethylene (LB742 Mfg. by USI) | Polydimethylsiloxane (SF 96 ®-50) | | As Molded | Aged 4 Hrs. At 125° C. | Aged 24 Hrs. At 125° C. |
| 4.2 parts per hundred | None | 10.5 | 15.3 | 11.2 | 2.3 |
| 4.2 parts per hundred | 0.1 parts per hundred | 10.9 | 15.3 | 11.7 | 2.4 |
| 4.2 parts per hundred | 0.25 parts per hundred | 10.3 | 15.2 | 11.7 | 5.9 |
| 4.2 parts per hundred | 0.5 parts per hundred | 10.7 | 15.2 | 12.4 | 3.5 |
| 4.2 parts per hundred | 0.75 parts per hundred | 11.4 | 14.1 | —* | 11.2 |

*One set of samples of this lot was aged 48 hours instead of four hours, since the four hour aging would not provide any additional information. The Notched Izod after 48 hours was 8.3.

It can be seen in the tables that while the silicone fluid has the usually expected detrimental effect on the impact strength of the polycarbonate resin when polyolefin is not present (compare the first two entries in Table 2), in the compositions of the present invention which contain also the polyolefin. The presence of the silicone fluid now has a markedly beneficial effect on the impact strength of the aged samples.

Other modifications and variations of the present invention are possible in the light of the above teachings. It is, therefore, to be understood that changes may be made in the particular embodiments described above which are within the full intended scope of the invention as defined in the appended claims.

What is claimed is:

1. A polycarbonate composition comprising in admixture a high molecular weight aromatic carbonate polymer and a minor amount of a polyolefin and a polyorganosiloxane of the following formula:

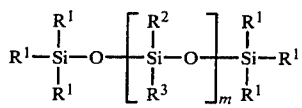

wherein $R^1$ is a radical selected from the group consisting of alkyl, haloalkyl, aryl, aralkyl, alkaryl, alkoxy, aryloxy, and halogenated derivatives of the aforesaid aryl, aralkyl, alkaryl, alkoxy or aryloxy radicals; $R^2$ and $R^3$ are radicals selected from the group consisting of straight chain or branched lower alkyl radicals containing from 1 to about 10 carbon atoms and phenyl radicals; and m is an integer of such value that the polyorganosiloxane is a fluid at ambient temperatures.

2. The composition of claim 1, wherein said aromatic carbonate polymer is derived from bisphenol-A.

3. The composition of claim 1, wherein the polyorganosiloxane is selected from the group consisting of polyorganosiloxane consisting of polymethylalkylsiloxane, polymethylphenylsiloxane, polydimethylsiloxane, polydiphenylsiloxane and copolymers thereof.

4. The composition of claim 1, wherein $R^1$, $R^2$ and $R^3$ are methyl.

5. The composition of claim 1, wherein the polyolefin is selected from the group consisting of polyethylene, polypropylene, polyisobutylene, ethylenepropylene, diene copolymer, copolymers and terpolymers.

6. The composition of claim 1, comprising from about 0.1 to about 10.0 parts polyorganosiloxane per hundred parts of aromatic carbonate polymer.

7. The composition of claim 1, comprising from about 0.2 to about 2.0 parts polyorganosiloxane per hundred parts of aromatic carbonate polymer.

8. The composition of claim 1, comprising from about 0.5 to about 10.0 parts polyolefin per hundred parts of aromatic carbonate polymer.

9. The composition of claim 1, comprising from about 2.0 parts to about 7.0 parts polyolefin per hundred parts of aromatic carbonate polymer.

* * * * *